US012653114B2

(12) United States Patent
 Ghio

(10) Patent No.: US 12,653,114 B2
(45) Date of Patent: Jun. 16, 2026

(54) SYSTEM FOR THE CULTIVATION OF PHOTOSYNTHETIC ORGANISMS, SUCH AS PLANTS OR THE LIKE

(71) Applicant: GERMINA S.R.L., Carrara (IT)

(72) Inventor: Marco Ghio, Carrara (IT)

(73) Assignee: GERMINA S.R.L., Carrara (IT)

( * ) Notice: Subject to any disclaimer, the term of this patent is extended or adjusted under 35 U.S.C. 154(b) by 229 days.

(21) Appl. No.: 18/568,777

(22) PCT Filed: Jun. 6, 2022

(86) PCT No.: PCT/IB2022/055252
 § 371 (c)(1),
 (2) Date: Dec. 8, 2023

(87) PCT Pub. No.: WO2022/259120
 PCT Pub. Date: Dec. 15, 2022

(65) Prior Publication Data
 US 2024/0260515 A1 Aug. 8, 2024

(30) Foreign Application Priority Data
 Jun. 9, 2021 (IT) ........................ 102021000015074

(51) Int. Cl.
 *A01G 9/24* (2006.01)
 *F21S 11/00* (2006.01)
 (Continued)

(52) U.S. Cl.
 CPC ............ *A01G 9/249* (2019.05); *F21S 11/002* (2013.01); *F21S 11/007* (2013.01); *F21V 7/0033* (2013.01); *F21V 7/06* (2013.01); *F21V 14/003* (2013.01)

(58) Field of Classification Search
 CPC ...... A01G 9/249; A01G 9/1423; A01G 31/06; F21S 11/002; F21S 11/007; F21V 7/0033; F21V 7/06; F21V 14/003; Y02A 40/25
 See application file for complete search history.

(56) References Cited

U.S. PATENT DOCUMENTS 10,030,844 B2 * 7/2018 Zampini ............ G02B 19/0014
10,314,243 B2 * 6/2019 Speer ................... G02B 6/0005
(Continued)

FOREIGN PATENT DOCUMENTS

JP H11127687 A 5/1999
JP 2011188772 A 9/2011
(Continued)

OTHER PUBLICATIONS

International Search Report and Written Opinion for PCT/IB2022/055252 mailed Oct. 4, 2022.

*Primary Examiner* — Tsion Tumebo
(74) *Attorney, Agent, or Firm* — Perilla Knox & Hildebrandt LLP; Kenneth A. Knox

(57) ABSTRACT

System for the cultivation of photosynthetic living organisms, such as plants (5), comprising a support structure for a plurality of shelves (1, 2) on which to cultivate said plants (5), said shelves (1, 2) being positioned one above the other, along a vertical axis, so as to identify a space (100, 110) interposed between the upper face of a shelf and the lower face of the overlying shelf, which space (100, 110) is adapted to cultivate the plants. A light (A, B, C) capture device (3) of a light source is provided, which capture device (3) is positioned above the highest shelf (1), there being transmission means of the light (A, B, C) connected to said capture device (3), which transmission means are configured for the transmission of the light (A, B, C) from the highest shelf (1) to the lower shelves, said activation/inactivation (Continued)

means of said capture device (3) and of said transmission means being provided.

9 Claims, 6 Drawing Sheets

(51) Int. Cl.
    *F21V 7/00*           (2006.01)
    *F21V 7/06*           (2006.01)
    *F21V 14/00*         (2018.01)

(56)            References Cited

U.S. PATENT DOCUMENTS

| | | | |
|---|---|---|---|
| 11,102,937 B2 * | 8/2021 | York | G02B 6/0073 |
| 2009/0021934 A1 * | 1/2009 | Chu | G02B 6/0006 |
| | | | 362/241 |
| 2009/0148931 A1 * | 6/2009 | Wilkerson | G02B 6/001 |
| | | | 362/555 |
| 2011/0103088 A1 * | 5/2011 | Wemmer | F21V 23/0464 |
| | | | 362/555 |
| 2011/0197317 A1 * | 8/2011 | Wong | C12M 23/22 |
| | | | 435/257.1 |
| 2011/0226311 A1 * | 9/2011 | Sun | H10F 77/488 |
| | | | 362/555 |
| 2016/0235014 A1 * | 8/2016 | Donham | A01G 7/045 |
| 2016/0327228 A1 * | 11/2016 | Farkas | G02B 19/0042 |
| 2016/0360712 A1 * | 12/2016 | Yorio | A01G 31/06 |

FOREIGN PATENT DOCUMENTS

| | | |
|---|---|---|
| JP | 2011216427 A | 10/2011 |
| KR | 101234015 B1 | 2/2013 |
| WO | 2020/204858 | 10/2020 |

* cited by examiner

SYSTEM FOR THE CULTIVATION OF PHOTOSYNTHETIC ORGANISMS, SUCH AS PLANTS OR THE LIKE

CROSS-REFERENCE TO RELATED APPLICATIONS

The present application is a national phase application under 35 U.S.C. § 371 of International Application No. PCT/IB2022/055252 filed Jun. 6, 2022, entitled, "SYSTEM FOR THE CULTIVATION OF PHOTOSYNTHETIC ORGANISMS, SUCH AS PLANTS OR THE LIKE," which claims the benefit of and priority to Italian Patent Application No. 102021000015074 filed Jun. 9, 2021, the contents of each of which being incorporated by reference in their entireties herein.

The present invention relates to a system for the cultivation of photosynthetic living organisms, such as plants or the like, comprising a support structure for a plurality of shelves on which to cultivate said plants.

In addition, the shelves are positioned one on top of the other, along a vertical axis, so as to identify a space between the upper face of a shelf and the lower face of the overlying shelf, which space is suitable for growing plants.

The one just described is the common configuration of the vertical greenhouses known to the state of the art, that is, which provide for the cultivation of plants on several shelves, arranged vertically one above the other.

The system that is the object of the present invention, as well as the vertical greenhouses known in the state of the art, is not limited to an arrangement of the shelves in an aligned manner along the vertical axis, but by the term "placed" it is meant that the shelves are positioned one above or below the other with respect to a vertical direction, without necessarily meaning that the upper shelf covers the lower shelf.

The known state-of-the-art vertical greenhouses have the obvious advantage of greatly reducing the overall dimensions of the same number of cultivated plants, as they do not require a horizontal extension of the cultivation ground, but exploit the vertical space.

It is evident that the vertical greenhouses known in the state of the art require the presence of artificial light sources, as most of the plants on the lower shelves are subject to the shade of the upper shelves and are not irradiated with the amount of light necessary for their growth.

In addition, even in the presence of artificial light sources, it is necessary to provide a careful and precise design of the lighting system, in order to obtain the correct compromise between irradiated light energy and light energy absorbed by plants.

In addition to being complex from a plant engineering point of view, such a design involves high costs, both for implementation and maintenance, also due to the required power consumption.

There is therefore a need, not satisfied by known state-of-the-art systems, for a vertical greenhouse that allows the cultivation of plants using both natural and artificial light and that optimises the emission or absorption of light radiation, based on the needs of the plants.

There is also a need to create a system that can allow the cultivation of plants, so as to optimise the use of natural light, even, but not exclusively, in low-light environments, such as natural or artificial caves.

The present invention achieves the above purposes by realising a system as described above, in which a light source capture device is provided, which capturing device is positioned above the highest shelf.

There are light source transmitting means connected to the capture device, which transmitting means are configured for transmitting the light source from the highest shelf to the lower shelves.

Means for activating/deactivating the capture device and the transmission means are also provided.

As will be apparent from the following disclosure, the activation and inactivation of the capture device and the transmission means makes it possible to irradiate the plants to the various shelves according to predetermined time intervals, so that each shelf is irradiated by the light source during a precise period.

The system of the present invention exploits the phenomenon of plant photosaturation.

In fact, in chlorophyll photosynthesis, plants absorb light radiation according to a sort of hysteresis of the amount of light they can absorb.

In fact, once the photosaturation threshold is reached, the plant, even if exposed to light, does not continue the process of photosynthesis.

Once the photosaturation threshold is reached, photosynthesis continues at its maximum rate and is unable to make use of excess radiation.

If the radiation continues to increase, the photosynthesis rate decreases to zero due to temporary or permanent damage to the photosystem.

The present invention, therefore, aims to exploit the excess radiation to a shelf and to distribute it to the lower shelves.

Furthermore, the biological process of photosynthesis is not instantaneous, that is, it does not start at the same time as the generation of light, but has a latency period, meaning that it begins after a certain period with respect to the generation of the light source.

Likewise, the photosynthesis process is not interrupted as soon as the light radiation ceases, but, again, has a latency period.

It follows that the process of photosynthesis begins after a certain period from the delivery of the light source and ends after a certain period with respect to the termination of the light source.

The system of the present invention therefore exploits this kind of hysteresis, optimising the transmission of light energy during said hysteresis periods.

As a result, the plants on a given shelf will be able to carry on the photosynthesis process even if they are inside a dark compartment, so that light energy is transferred to the shelves below.

The present invention makes use of pulsed lighting technology, in which periods of darkness and light alternate with certain frequencies.

This is because, in the dark, the rate of photosynthesis decreases, but it does not take long before it ceases, that is, the plant continues to photosynthesise even in the dark.

This phase is followed by the light re-ignition, in which the photosystem is gradually reactivated even if the light flow is immediately the nominal one.

If the frequency of the light/dark phases is greatly increased, the photosystem will not be at the characteristic rate of the flow of the light phase, but at values similar to those that would be distributed by a lower continuous luminous flux, with the same energy consumption.

This results in an optimisation of the radiation energy required to enable the chlorophyll photosynthesis process of all plants within the support structure to take place.

Furthermore, the conveyance and vertical transmission of light makes it possible to create vertical greenhouses also through natural light that radiates only the top shelf.

According to one embodiment, it is possible to differentiate the types of cultivation according to the shelf, dedicating the lower shelves to cultivations that require less light than the cultivations on the upper shelves.

It is also possible to provide a combination of natural light and artificial light sources, in order to compensate for any lack of natural light.

The embodiments that will be disclosed below are intended to improve and industrialise the general concept just described and to enable optimisation of the realisation of the support structure belonging to the system covered by the present invention.

According to a first embodiment, the transmission means comprises a transmission channel configured to transmit light radiation from one shelf to another and a plurality of diffuser elements connected to the transmission channel, at least one diffuser element being provided for each shelf.

The presence of a diffuser element per shelf allows the amount of light provided to be precisely adjusted for each shelf, preferably by means of an adjustment system that can vary the duty cycle for lighting each shelf.

In particular, the capture device and the diffuser elements pass from an active condition, in which they transmit the light source to the lower shelves, to an inactive condition, in which they do not transmit the light source to the lower shelves.

The transmission channel is therefore a means in which the light radiation is displaced and the passage of the light radiation is allowed on the basis of the activation/inactivation of the capture device and of the diffuser elements.

According to one embodiment, the transmission of light to the shelves below is obtained based on the amount of radiation for each shelf.

For this reason, advantageously, the activation/inactivation means may comprise at least one light radiation detection device on each shelf.

This variant is particularly advantageous as, for many types of plants, photosaturation, i.e., the amount of radiation measured in watts/m$^2$, is known.

In this way, it is possible to adapt the activation/inactivation of the light transmission based on the types of plants present on the different shelves.

The capture device and the diffuser elements can be made in any of the ways known to the state of the art, as long as they can be activated/deactivated to allow the passage of the light radiation inside the transmission channel.

For example, the diffuser elements can be made through shielding elements, which are moved through special movement mechanisms, so as to interfere/not interfere with the light radiation transmission channel.

Similarly, the capture device may be realised according to a further filter element that interferes/does not interfere with the light radiation generation source.

Advantageously, the activation/inactivation means are configured to control independently each individual diffuser element and the capture device by an electronic control system.

According to a preferred embodiment, the capture device consists of a first parabolic section element arranged with the concavity facing the top of the shelf and a second parabolic section element, smaller in size than the first parabolic section element, placed above the first parabolic section element and with the concavity facing in the direction of the first parabolic section element.

An end of the transmission channel is also placed in an identified space between the two parabolic section elements.

In particular, the first and second parabolic section elements transition from a transparent condition corresponding to the inactive condition of the capture device to a reflective condition corresponding to the active condition of the capture device.

As will be disclosed later, through the illustration of some exemplary embodiments, a lens is provided to focus the light radiation entering the transmission channel.

To optimise the focusing effect of the light radiation, preferably, the end of the transmission channel is placed at the focus of the second parabolic section element.

According to one improvement, the diffuser elements may be made in a manner similar to the capture device.

In particular, each diffuser element consists of a third parabolic section element arranged with the concavity facing the top of the shelf and a fourth parabolic section element, larger than the third parabolic section element, placed above the third parabolic section element and with the concavity facing the direction of the third parabolic section element.

The transmission channel passes through at least the third parabolic section element.

In addition, the third and fourth parabolic section elements switch from a transparent condition, corresponding to the active condition of the diffuser device, to a reflective condition, corresponding to the inactive condition of the diffuser device.

The transition from the transparent to the reflective condition is preferably achieved through a change in the state of the walls constituting the parabolic section elements.

For this reason, these elements include glass that becomes transparent or reflective based on the electric current that travels through them.

Such glasses are known to the state of the art under the brand name of Priva-Lite® and are comprised of materials that, polarised, can modify the transparency of the glass itself.

According to this configuration, the activation/inactivation means are connected to the diffuser elements and to the capture device through electrical connection cables, with the activation/inactivation means including a control unit configured to set the electrical current to be sent to the diffuser elements and the capture device.

According to a further embodiment, the activation/inactivation means are configured to set the diffuser elements and the capture device in the active condition according to predetermined time intervals.

In this way it is possible to adjust the transmission of light between the shelves, so as to alternate the periods of light/shade on the basis of the photosynthesis cycle of the various plants on the various shelves, so that the plants "do not notice" that the light radiation has ceased while they are completing the photosynthesis cycle.

It follows that, by electronically managing the light/dark phases for each shelf with very fast time frames, e.g., in the order of tenths of a second, it is possible to guarantee a more subdued, but practically "constant" light for the various shelves by targeting the photo-saturation threshold for each plant and thus optimising the cultivation lighting without activating the plants' own processes of protection from excessive light.

As mentioned above, the system that is the object of the present invention enables the construction of vertical greenhouses that make use of natural light, which is provided at the entrance to the highest shelf. However, it is possible for the system to exploit natural light and artificial light as an alternative or in combination.

For this reason, the support structure comprises a source for generating light radiation.

These and other features and advantages of the present invention will become clearer from the following disclosure of some exemplary embodiments illustrated in the accompanying drawings in which.

It should be noted that, in order to better understand the advantages and features disclosed, the Figures attached to this patent application illustrate only some possible forms of the system for the nursery cultivation of plants covered by the present invention.

These embodiments are therefore intended purely for illustrative purposes and not as a limitation to the inventive concept of the present invention, i.e., that of creating a vertical greenhouse capable of optimised use of light, also making it possible to use natural light.

Figure 1:
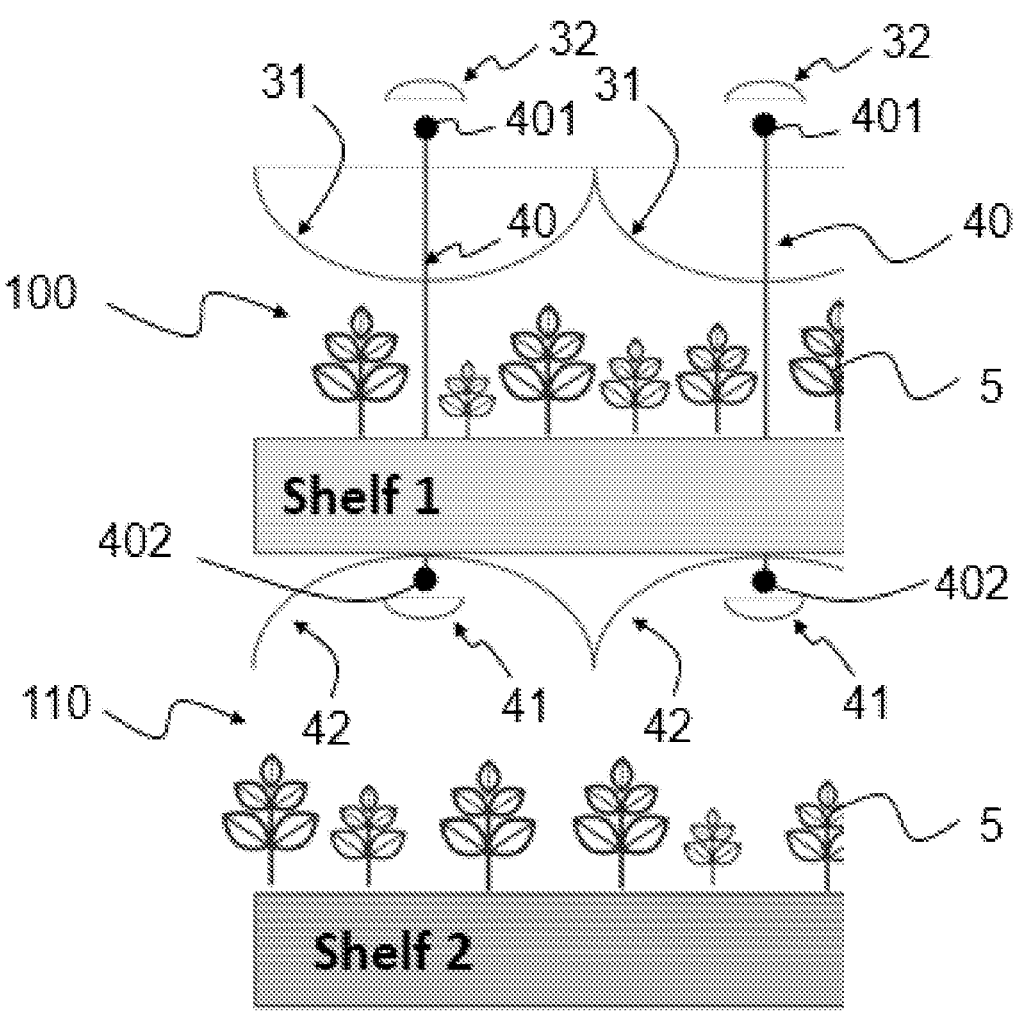
FIG. 1 illustrates an exemplary diagram of a sectional view of the system that is the object of the present invention, according to one possible embodiment.

With particular reference to FIG. 1, an illustrative diagram of the system covered by the present invention is illustrated.

The system that is the object of the invention has a vertical greenhouse that includes a support structure (not illustrated in the Figures) made according to any of the methods known to the state of the art.

The support structure sustains a plurality of shelves 1, 2 on which to cultivate plants 5.

The shelves 1, 2 are positioned one above the other, along a vertical axis, so as to identify a space 100, 110 interposed between the upper face of a shelf 2 and the lower face of the overlying shelf 1, which space is adapted to cultivate the plants 5, 30 FIG. 1 shows a view of a section of part of the components of the system that is the object of the present invention, in which a light source is assumed to be generated at the top of the system, i.e., above shelf 1.

In addition, FIG. 1 shows a view of the system with two shelves 1 and 2, but, as will be disclosed later and with reference to FIG. 3, it will be evident how the system that is the object of the present invention can be made with any number of shelves.

In particular, the system comprises a light capture device 3 of the light source, positioned above the highest shelf 1.

The light source radiates the space 100 relating to the plants grown on shelf 1, but can be transferred to the lower shelf by means of transmission means, consisting of a transmission channel 40 and diffuser elements 4. The transmission channel may for example be constituted by any means configured to carry the light energy, such as an optical fibre or a light guide.

FIG. 1 illustrates two capture devices 3 optically connected to two corresponding diffuser elements 4 through two transmission channels 40, but it is evident that it is possible to use any number of such components.

Preferably, for simplicity of construction, a capture device 3 corresponds to a diffuser element 4 per shelf and a single transmission channel 40.

According to the embodiment illustrated in FIG. 1, the capture device 3 consists of a first parabolic section element 31 arranged with the concavity facing the top of the shelf 1 and a second parabolic section element 32, placed above the first parabolic section element 31 and with the concavity facing in the direction of the first parabolic section element 31.

The second parabolic section element 32 is smaller in size than the first parabolic section element 31.

Parabolic section elements 31 and 32 are preferably concave elements.

It is possible, however, to contemplate any three-dimensional shape that has a parabolic cross-section, such as funnel, semi-cylindrical or similar shapes.

As will be evident from the following disclosure, the concave shape makes possible the best possible collection of light in order either to radiate it into the space 100 or transmit it to the transmission channel 40.

The diffuser element 4 is made in an entirely similar way to the capture device 3, but is arranged in a specular manner, that is, it has a third parabolic section element 41 arranged with the concavity facing the top of the shelf 2 and a fourth parabolic section element 42, of greater dimensions than the third parabolic section element 41, and placed above the third parabolic section element 41 and with the concavity facing the direction of the third parabolic section element 41.

All the parabolic section elements 31, 32, 41, 42 are made of a material such that they pass from a condition of transparency, that is, in which they are transparent to the light radiation, to a reflective condition, that is, in which they reflect the light radiation.

As will be seen later, the transition from the transparent condition to the reflective condition enables/disables the transmission of the light source to the lower shelves.

The transparent condition of capture device 3 disables transmission to the lower shelves (due to their design), while the reflective condition enables transmission.

Conversely, the transparent condition of the diffuser element 4 enables transmission to the lower shelves, while the reflective condition disables transmission of the light source to the lower shelves.

According to the variant illustrated in FIG. 1, the transmission channel 41 has two ends, an upper end and a lower end, located in the focus of the parabolas of the second parabolic section element 32 and the third parabolic section element 41, respectively.

Advantageously, at the upper end of the transmission channel 40, a focusing lens 401 is provided, while at the lower end a diffusion lens 402 is provided.

As is evident from FIG. 1, the transmission channel 40 has its upper end in the space identified by the first 31 and second 32 parabolic section elements, while it has its lower end in the space between the third 31 and fourth 42 parabolic section elements.

To adjust the transition from the transparent condition to the reflective condition, there are activation/inactivation means not illustrated in the figures.

According to a preferred embodiment, the parabolic section elements 31, 32, 41, 42 consist of glasses known to the state of the art under the brand name of Priva-Lite®, which pass from transparent glasses to reflective glasses thanks to the characteristics of electric currents that run through them.

For this reason, preferably, the activation/inactivation means are electrically connected to the parabolic section elements 31, 32, 41, 42 and have an electric power generation unit, together with a processing unit.

The processing unit generates control signals to be sent to the parabolic section elements, in particular electrical current intensity in order to change the condition of transparent or reflective even with progressive variations to convey the light with various degrees of intensity in the various shelves.

The currents are preferably generated so that, according to predetermined intervals, only one shelf is irradiated with the light energy, so as to exploit the effect of photosaturation of the plants 5.

According to one possible embodiment, the duration of the intervals can be established on the basis of the irradiation of each shelf and/or on the basis of the type of plants grown on each shelf.

Figure 2A:
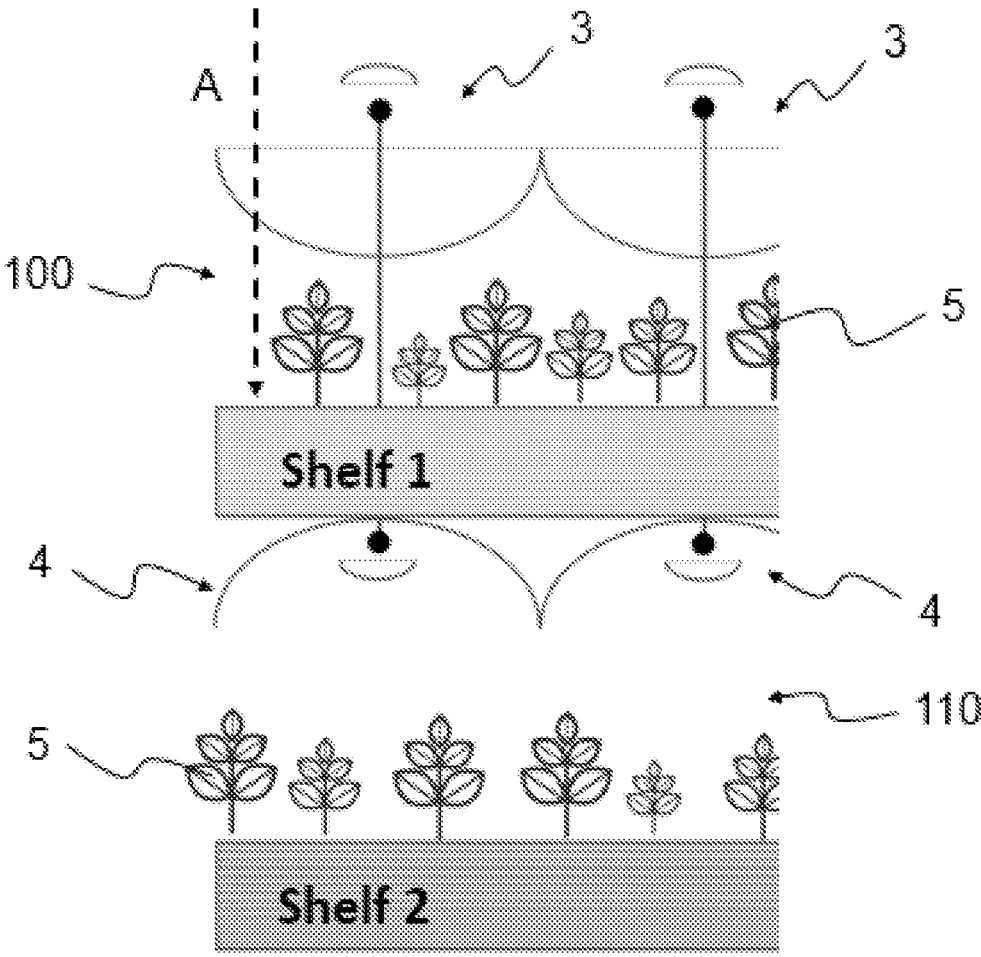
FIGS. 2a and 2b illustrate the variant of FIG. 1 under two different operating conditions of the system components.
Figure 2B:
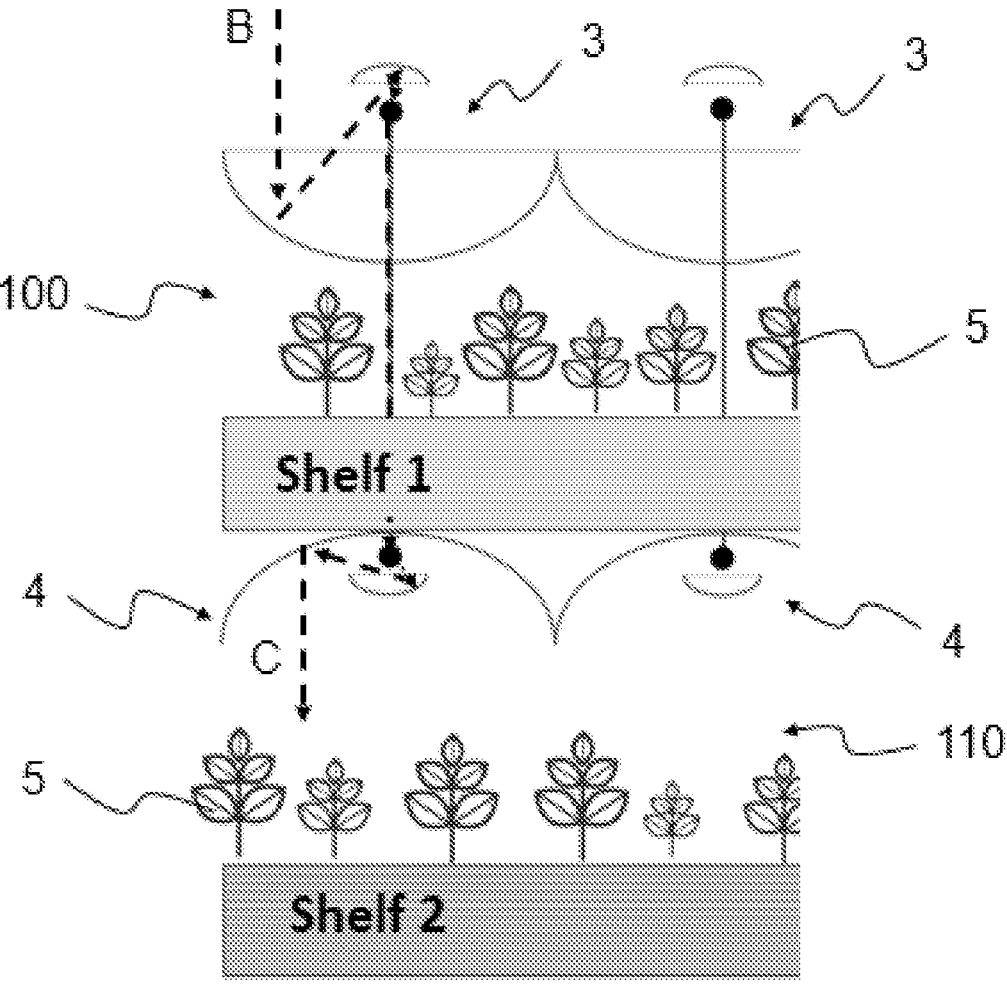

Based on the characteristics of the system disclosed, FIGS. 2a and 2b illustrate the operation of said system.

In FIG. 2a, the parabolic section elements 31 and 32 are in a transparent condition, whereby the light source, illustrated with arrow A, which is generated in the upper part of the shelf 1, passes through the transparent elements 31 and 32 and radiates the entire space 100 of the shelf 1.

It follows that the shelf 1 is illuminated by the light radiation, while the space 110 of the shelf 2 is in the dark.

It is specified that, preferably, the capture devices 3 and the diffuser elements 4 are independently controlled for each shelf 1, 2. However, it is also possible for each single parabolic element to be controlled independently.

In fact, with reference to FIG. 2a, it is sufficient that only the parabolic section element 31 is transparent to diffuse the light inside the space 100, while the parabolic section element 32 can be in any condition, although if it were in the reflective state, it would produce an unwanted and unnecessary shadow on the shelf 1.

FIG. 2b illustrates a change of state of the system that is the object of the present invention, in which the activation/inactivation means generate current signals to be sent to the parabolic section elements 31, 32, 41, 42 so that both the capture device 3 and the diffuser element 4 are in a reflective condition.

When the surfaces of the parabolic section elements 31 and 32 are polarised, they are completely mirror-like reflective and the light beam, indicated by the arrow B, is reflected by the first parabolic surface of the element 31, converging on the second parabolic surface of the element 32, also reflective which further focuses the rays at the point where the concentration lens 401 allows them to be injected into the transmission channel 40, such as for example a light guide. In this way, the shelf 1 is in the dark. All the rays are channelled into the light guide 40, which runs through the shelf 1 and reaches the diffuser element 4, in a reflective condition.

The light rays channelled into the light guide 40 through the diffusion lens 402 are diffused towards the reflective surfaces of the element 42, arrow C, which thus diffuses them and illuminates the shelf 2.

The parabolic shape of the elements 31, 32, 41, 42 allows the light source to be captured, regardless of the direction of origin of the latter.

Furthermore, in the case of light coming from the top of the shelf 1, a correct positioning of the parabolic section element 31 at the top wall of the shelf allows all the light to be captured within the area identified by the concave part of the parabolic section element 31.

As mentioned above, the system that is the object of the present invention is not limited to two single shelves, as illustrated in FIGS. 1 to 2b, but the disclosed operation and features can be contemplated for three or more shelves.

Figure 3:
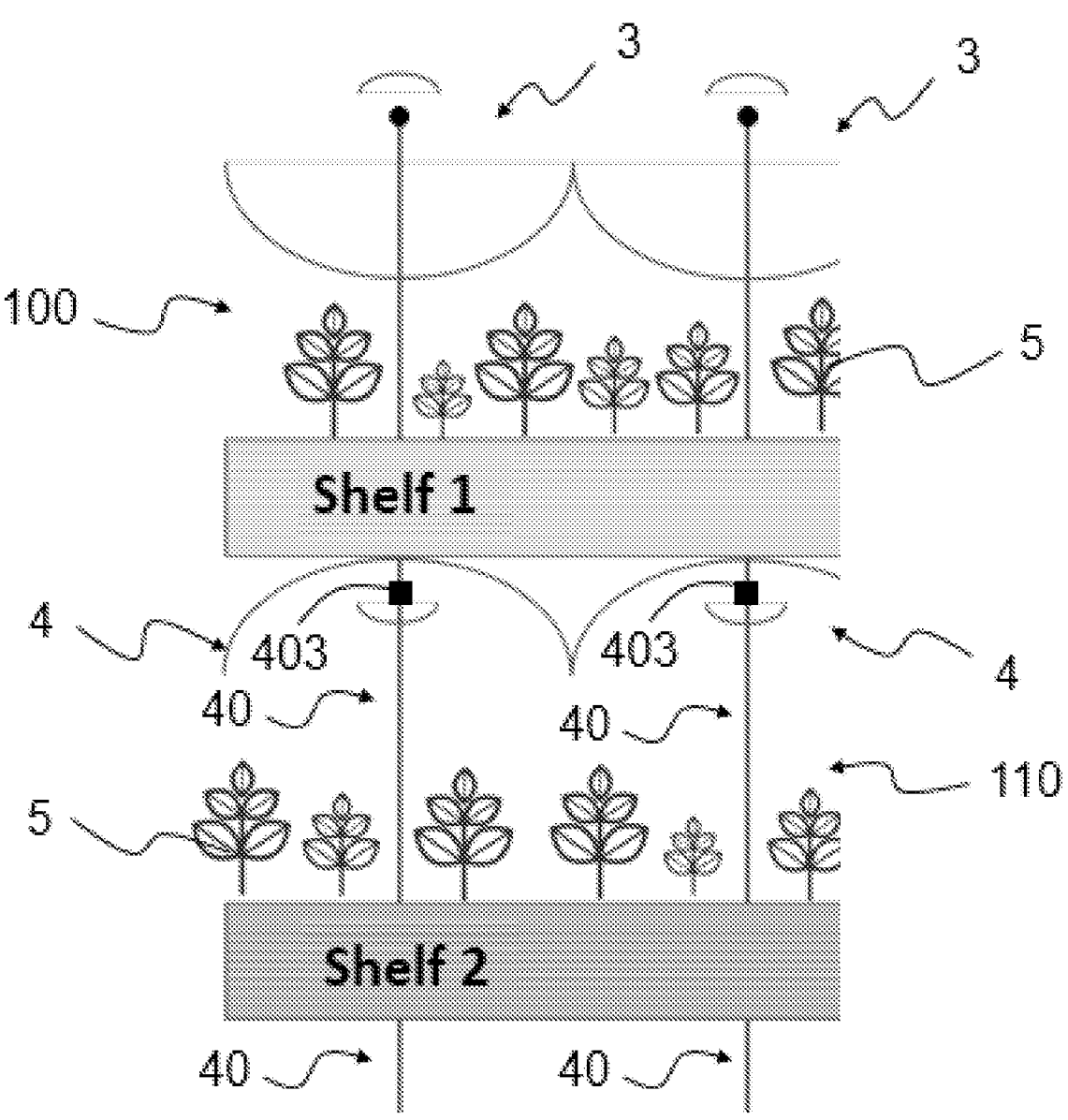
FIG. 3 illustrates an exemplary diagram of a sectional view of the system that is the object of the present invention, according to a further embodiment.

In this case, FIG. 3, instead of stopping at the top of the shelf 2, the transmission channel 40, i.e., the light guide 40, extends over the entire height of the greenhouse, as shown in FIG. 3.

Preferably, unlike the embodiment illustrated in the previous Figures, each shelf, unlike the lens 401, has an optical element 403, for each diffuser element 4, the operation of which will be disclosed below.

Figure 4A:
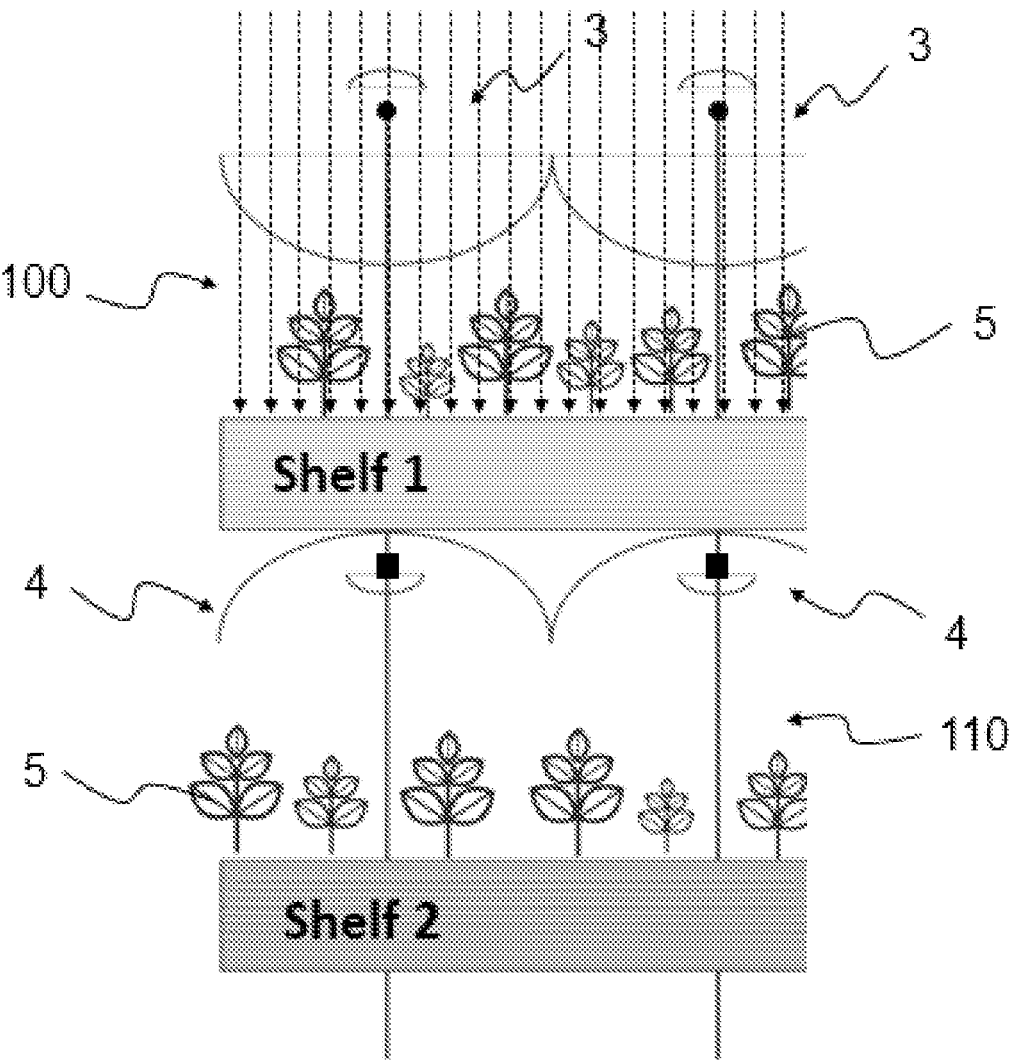
FIGS. 4a and 4b illustrate the variant of FIG. 3, according to two different operating conditions of the system components.
Figure 4B:
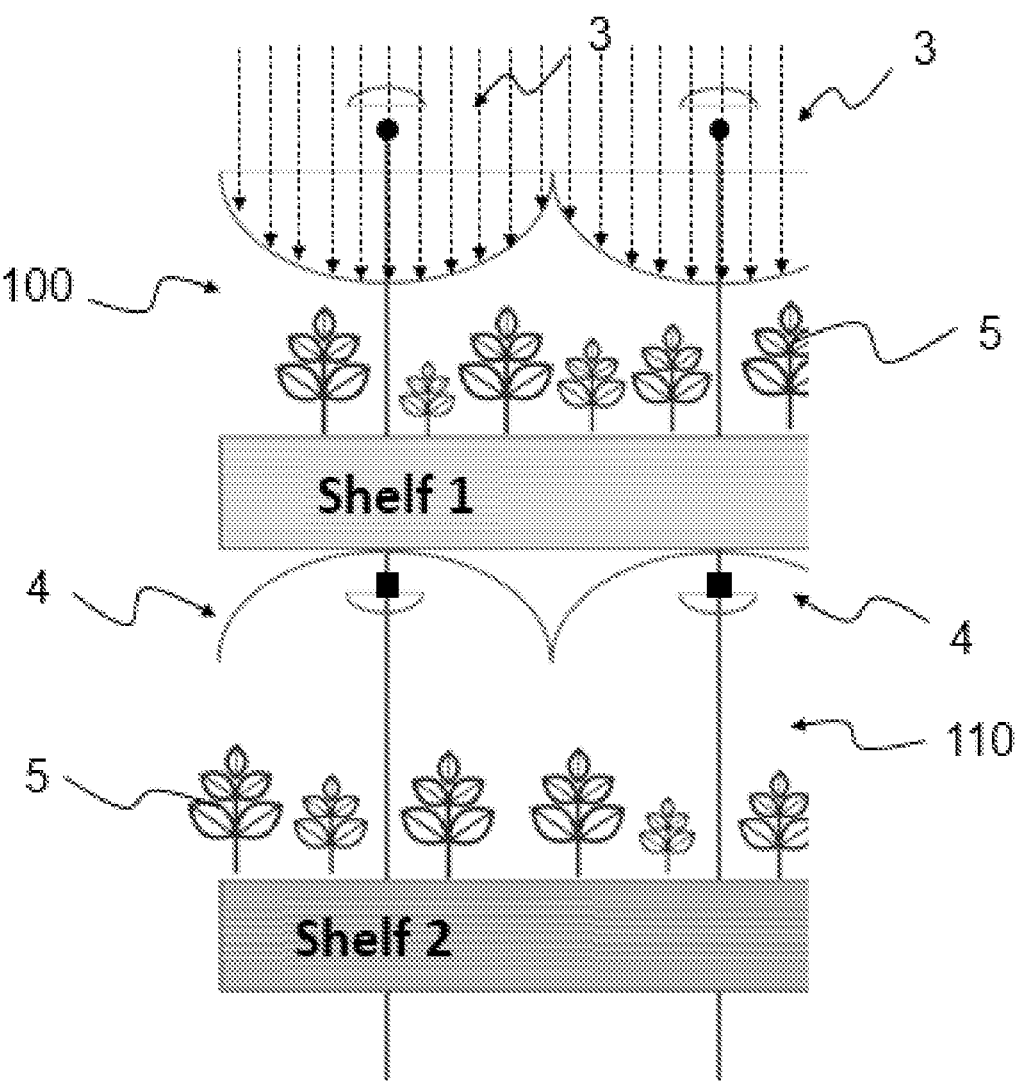

Operation in the case of a plurality of shelves is very similar to that described above and is briefly summarised with respect to FIGS. 4a and 4b.

In FIG. 4a, the capture device 3 is in a transparent condition, whereby the light source, generated in the upper part of the shelf 1, diffuses within the zone 100 of the shelf 1, without being transmitted to the shelf 2.

In FIG. 4b, however, the capture element 3 is in a reflective condition, whereby the radiation from the light source is reflected and transmitted in the light guide 40 according to the methods disclosed above.

Once the light radiation is conveyed inside the light guide 40, this radiation is transmitted to the shelves below the shelf 1.

Transmission is via the optical element 403, which is preferably remote controlled.

By means of an electronic control, the optical element 403 can assume the functions of a diffusive lens, just like the lens 402, in the case where the corresponding shelf is to be illuminated, or of a simple neutral lens (without any convergence or divergence function) in the case where the light beam passing through the light guide 40 is to be used to illuminate the lower shelves.

Therefore, changing the state of the element 403 allows the light to be diffused within the corresponding shelf or to allow the light to pass to the shelves below.

By suitably combining both the dual function of the optical element 403 and the condition of the parabolic section elements 41, 42, the scattering of light is allowed on a single shelf below the first shelf.

In the case where the diffuser element 4 is in a reflective condition, as in the case of FIG. 2b, and the optical element 403 in a diffusion condition, such as the lens 402, the light radiates the zone 110 of the shelf 2.

If the diffuser element 4 is in a transparent condition and the optical element 403 in a neutral condition, the light radiation passes through the light guide 40, finds no obstruction at the optical element 403, and can therefore be transmitted to the shelves below shelf 2.

The shelves below the shelf 2 will therefore be illuminated or be in the dark based on the condition of the diffuser elements 4 and the optical element 403 of each shelf, the operation of which is the same as that disclosed for the shelf 2.

Advantageously, the control unit of the transparent/reflective condition of the parabolic section elements 31, 32, 41, 42 is the same as the optical elements 403.

Finally, it should be noted that the system that is the object of the present invention may, like the vertical greenhouses known in the state of the art, have an irrigation system suitable for watering plants 5.

Such an irrigation system may, for example, consist of one or more channels provided in the overhead walls of each shelf, or by imbibition through irrigation systems in the shelves themselves.

While the invention is susceptible to various modifications and alternative constructions, some preferred embodiments have been shown in the drawings and disclosed in detail.

It should be understood, however, that there is no intention to limit the invention to the specific illustrated embodiment but, on the contrary, the aim is to cover all the modifications, alternative constructions and equivalents falling within the scope of the invention as defined in the claims.

The use of "for example", "etc." or "or" refers to non-exclusive non-limiting alternatives, unless otherwise stated.

The use of "includes" means "includes but is not limited to", unless otherwise stated.

The invention claimed is:

1. A system for a cultivation of photosynthetic living organisms, the system comprising:

a support structure of a plurality of shelves on which plants are to be cultivated, wherein the plurality of shelves are being positioned one above another, along a vertical axis, so as to identify a space interposed between an upper face of a shelf and a lower face of an overlying shelf, which space is adapted to cultivate the photosynthetic living organisms;

a light source capture device positioned above a highest shelf, wherein the light source capture device comprises a first parabolic section element arranged with a concavity facing a top of the shelf and a second parabolic section element, of smaller dimensions than the first parabolic section element, placed above the first parabolic section element and with the concavity facing in a direction of the first parabolic section element;

a light source transmission means connected to the light source capture device configured for a transmission of a light source from the highest shelf to lower shelves, wherein the light source transmission means comprise a transmission channel configured to transmit a light radiation from one shelf to the another and a plurality of diffuser elements connected to the transmission channel, wherein one end of the transmission channel is placed in an identified space between the first and the second parabolic section elements, wherein the first and the second parabolic section elements are passing from a transparent condition, corresponding to an inactive condition of the light source capture device, to a reflective condition, corresponding to an active condition of the light source capture device; and a control unit for activating and deactivating the light source capture device and the light source transmission means.

2. The system according to claim 1, wherein the light source capture device and the plurality of diffuser elements pass from the active condition, in which they transmit the light source to the lower shelves, to an inactive condition, in which they do not transmit the light source to the lower shelves.

3. The system according to claim 1, wherein the end of the transmission channel is positioned at a focus of the second parabolic section element.

4. The system according to claim 1, wherein the plurality of diffuser elements comprises a third parabolic section element arranged with the concavity facing the top of the shelf and a fourth parabolic section element, of greater dimensions than the third parabolic section element, placed above the third parabolic section element and with the concavity facing in the direction of the third parabolic section element, passing the transmission channel through the third parabolic section element, the third and the fourth parabolic section elements passing from a transparent condition, corresponding to the active condition of the plurality of diffuser elements, to a reflective condition, corresponding to the inactive condition of the plurality of diffuser elements.

5. The system according to claim 1, wherein the control unit is configured to control independently each of the plurality of diffuser elements and the light source capture device.

6. The system according to claim 1, wherein the control unit is connected to the plurality of diffuser elements and to the light source capture device through electrical connection cables, wherein the control unit configured to set an electrical current to be sent to the plurality of diffuser elements and to the light source capture device.

7. The system according to claim 1, wherein the control unit is configured to set the plurality of diffuser elements and the light source capture device in the active condition according to predetermined time intervals.

8. The system according to claim 1, wherein the control unit comprise a light energy quantity detection device for each shelf.

9. The system according to claim 1, wherein the light source capture device and the plurality of diffuser elements pass from an active condition, in which they transmit the light source to the lower shelves, to an inactive condition, in which they do not transmit the light source to the lower shelves.

* * * * *